US011663558B1

(12) United States Patent
Provencher et al.

(10) Patent No.: US 11,663,558 B1
(45) Date of Patent: May 30, 2023

(54) IDENTIFICATION AND COORDINATION OF MULTIPLE INDIVIDUALS

(71) Applicant: CERNER INNOVATION, INC., Kansas City, KS (US)

(72) Inventors: Ryan Provencher, Downingtown, PA (US); Jean Anderson, Phoenixville, PA (US); Samuel Rajkumar Baskar Rao, Chester Spring, PA (US); Ambar Ray, West Bengal (IN); Manoj Jacob, Muttuchira (IN); Kimberly A. Kavchok, Gilbertsville, PA (US); Brian O. Thomas, Coatesville, PA (US); Aditya Prakash Belapurkar, Malvern, PA (US); Rose Mary McGroarty, Mickleton, NJ (US)

(73) Assignee: CERNER INNOVATION, INC., Kansas City, MO (US)

( * ) Notice: Subject to any disclaimer, the term of this patent is extended or adjusted under 35 U.S.C. 154(b) by 720 days.

(21) Appl. No.: 15/855,698

(22) Filed: Dec. 27, 2017

(51) Int. Cl.
G06Q 10/10 (2023.01)
G06Q 10/1093 (2023.01)

(52) U.S. Cl.
CPC ............................. G06Q 10/1095 (2013.01)

(58) Field of Classification Search
None
See application file for complete search history.

(56) References Cited

U.S. PATENT DOCUMENTS

| 7,689,441 | B1 | 3/2010 | Craft |
| 7,707,153 | B1* | 4/2010 | Petito .................... G06Q 10/10 707/999.101 |
| 8,775,207 | B2 | 7/2014 | Abraham et al. |
| 2007/0027729 | A1 | 2/2007 | Bruaene et al. |
| 2007/0208604 | A1* | 9/2007 | Purohit ............. G06Q 10/1095 705/7.19 |
| 2009/0119126 | A1* | 5/2009 | Johnson ......... G06Q 10/063116 705/2 |
| 2009/0265185 | A1 | 10/2009 | Finn et al. |
| 2011/0125539 | A1* | 5/2011 | Bollapragada ....... G06Q 10/043 705/7.12 |
| 2011/0246226 | A1* | 10/2011 | Green, III ............. G16H 40/20 705/2 |

(Continued)

*Primary Examiner* — Alan Torrico-Lopez
(74) *Attorney, Agent, or Firm* — Kraguljac Law Group, LLC

(57) ABSTRACT

Computerized systems and methods for facilitating coordination for multiple individuals are provided. Search parameters are received and a plurality of individuals that satisfy the search parameter(s) is determined and provided. A user is able to select multiple individuals at the same time to coordinate from within the plurality of individuals. Once selected, a process for each of the selected individuals is launched. A plurality of scheduling options, based on an activity or event input, is provided. The plurality of scheduling options includes a time for each individual selected to be scheduled/processed. Once a scheduling option is selected, times within the selected scheduling option are locked such that (1) no other user can access the selected times and (2) processes for each of the multiple selected individuals may be completed in the same application without the need for opening separate processes for each process.

20 Claims, 19 Drawing Sheets

(56) References Cited

U.S. PATENT DOCUMENTS

| | | | | |
|---|---|---|---|---|
| 2013/0064358 A1* | 3/2013 | Nusbaum | .......... | H04M 3/42068 |
| | | | | 379/88.16 |
| 2013/0282391 A1 | 10/2013 | Easterhaus et al. | | |
| 2015/0317441 A1* | 11/2015 | Lorman | ................ | G16H 40/20 |
| | | | | 705/3 |
| 2017/0039529 A1* | 2/2017 | Reicher | .............. | G06Q 10/1095 |
| 2017/0124526 A1* | 5/2017 | Sanderford | ........ | G06Q 10/1095 |

\* cited by examiner

| | Patient | | Start | Duration | Activity | Resource | Location | Encounter |
|---|---|---|---|---|---|---|---|---|
| ☐ | Smith, Jane | 06/14/1972 (43Y) | 10/15/2015 09:30 AM | 000 02:00 | INFUSION IN C... | SSCTR2SSCT... | SSADESSODE... | 0123456789... |
| ☒ | Smith, Mary | 04/21/2000 (15Y) | 10/15/2015 11:15 AM | 000 00:15 | BLOODDRAW | SSIDE | SSIDE | 01234567 |
| ☐ | Smith, John | 10/05/2004 (11Y) | 10/15/2015 11:30 AM | 000 00:15 | CONSULT | SSIDE | SSIDE | 01234568 |
| ☐ | Smith, John | 10/05/2004 (11Y) | 10/15/2015 11:45 AM | 000 00:30 | BLOODDRAW | SSIDE | SSIDE | 01234569 |

There are other appointments coordinated with the one you just processed. You can repeat the same task with any of the other coordinated appointments. Select the one to process next or cancel to go to another task.

1400

1401

OK   Cancel

Webpage Dialog

Appointments Scheduled for: Lou Henry Hoover ~1501
DOB: 06/12/1967   (48Y)   Female   SS#:   MR#: 11040196   (Issuer: Hospital XYZ)

Appointments:

| Date | Start | Duration | Activity | Primary Resource | Location | Diagnosis | MN Status | ABN |
|------|-------|----------|----------|------------------|----------|-----------|-----------|-----|
| 02/10/2016 | 09:30 | 210 | KNEE | CGXRM1 | CTYGEN | | | |
| 02/10/2016 | 10:00 | 60 | CATSCANBIOPSY | CTYGENCATSCR1 | CTYGEN | | | |
| 02/10/2016 | 11:00 | 60 | CTBX | SSCTR1 | SSIDE | | | |

Diagnoses:

Services:

| Service | Service User Generated ID | Service Provider Service ID Issuer | Service Provider Service ID | CPT Code |
|---------|---------------------------|-------------------------------------|-----------------------------|----------|

1500
1502

| Coordinated Appointments | | | | | | | |
|---|---|---|---|---|---|---|---|
| Patient | | Start | Duration | Activity | Resource | Location | Encounter |
| Smith, Jane | 06/14/1972 (43) | 10/15/2015 09:30 AM | 000 02:00 | INFUSIONINC... | SSCTR2SSCT... | SSADESSODE... | 0123456789... |
| Smith, Mary | 04/21/2000 (15) | 10/15/2015 11:15 AM | 000 00:15 | BLOODDRAW | SSIDE | SSIDE | 01234567 |
| Smith, John | 10/05/2004 (11) | 10/15/2015 11:30 AM | 000 00:30 | CONSULT | SSIDE | SSIDE | 01234568 |
| Smith, John | 10/05/2004 (11) | 10/15/2015 11:45 AM | 000 00:15 | BLOODDRAW | SSIDE | SSIDE | 01234569 |

FIG. 16

IDENTIFICATION AND COORDINATION OF MULTIPLE INDIVIDUALS

BACKGROUND

Scheduling medical services is a time consuming task that, often, involves more than one individual as the subject of the process. For example, multiple family members may need to be scheduled for medical services at the same time or on the same day. Additionally, subsequent actions are frequently necessary once an initial action has been input (e.g., an initially scheduled appointment needs to be rescheduled, cancelled, etc.). When multiple individuals are involved, each appointment of the multiple individuals has to be individually acted upon (e.g., cancelled individually) and also has to be individually corrected (e.g., each individual appointment rescheduled for another time).

Providers typically utilize electronic scheduling applications to manage scheduling. These electronic scheduling systems have advanced the state of the art well beyond and provide many efficiencies over traditional scheduling methods where a scheduler writes an appointment in a hardcopy appointment book. Currently, using such a scheduling application, a user would likely open multiple appointment management business processes to attempt to coordinate appointment times (or other events) for multiple individuals. This method is time consuming and often still results in appointment times being taken by others users by the time the workflow can be separately completed for each individual.

BRIEF SUMMARY

Embodiments of the present invention generally relate to computerized systems and methods that facilitate coordination of appointments for multiple individuals. In accordance with the technology described herein, one or more input/search parameters are received via a user interface provided by a scheduling application. A plurality of individuals that satisfy (e.g., match) the search parameter(s) is determined and provided. A user is able to select multiple individuals at the same time to coordinate from within the plurality of individuals. Once selected, a processing application is launched and a process for each of the selected individuals is provided within the scheduling application. Input regarding an activity or event for each individual is provided. A plurality of scheduling options, based on the activity or event input, is provided. The plurality of scheduling options includes a time for each individual selected to be scheduled. Once a scheduling option is selected, times within the selected scheduling option are locked such that (1) no other user can access the selected times until either expiration of a configurable threshold or completion of a configurable metric and (2) processes for each of the multiple selected individuals may be completed in the same application without the need for opening separate processes for each process. Prompts may also be provided to maintain consistency across coordinated workflows.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

The present invention is described in detail below with reference to the attached drawing figures, wherein:

FIG. 3 is a screenshot showing a user interface for searching for individuals in accordance with an embodiment of the present invention;

FIG. 5 is a screenshot showing a user interface for aggregating selected individuals in accordance with an embodiment of the present invention;

FIG. 6 is a screenshot showing a user interface for searching for additional individuals in accordance with an embodiment of the present invention;

FIG. 7 is a screenshot showing a user interface for selecting additional individuals in accordance with an embodiment of the present invention;

FIG. 9 is a screenshot showing a user interface for entering events/processes for individuals in accordance with an embodiment of the present invention;

FIG. 12 is a screenshot showing a user interface for populating scheduling options for individuals in accordance with an embodiment of the present invention;

FIG. 13 is a screenshot showing a user interface for alternative population of scheduling options for individuals in accordance with an embodiment of the present invention;

FIG. 14 is a screenshot showing a user interface for prompting for action across coordinated individuals in accordance with an embodiment of the present invention;

FIG. 15 is a screenshot showing a user interface indicating coordinated individuals in accordance with an embodiment of the present invention;

FIG. 16 is a screenshot showing a user interface providing information for coordinated individuals in accordance with an embodiment of the present invention;

DETAILED DESCRIPTION

Figure 1:
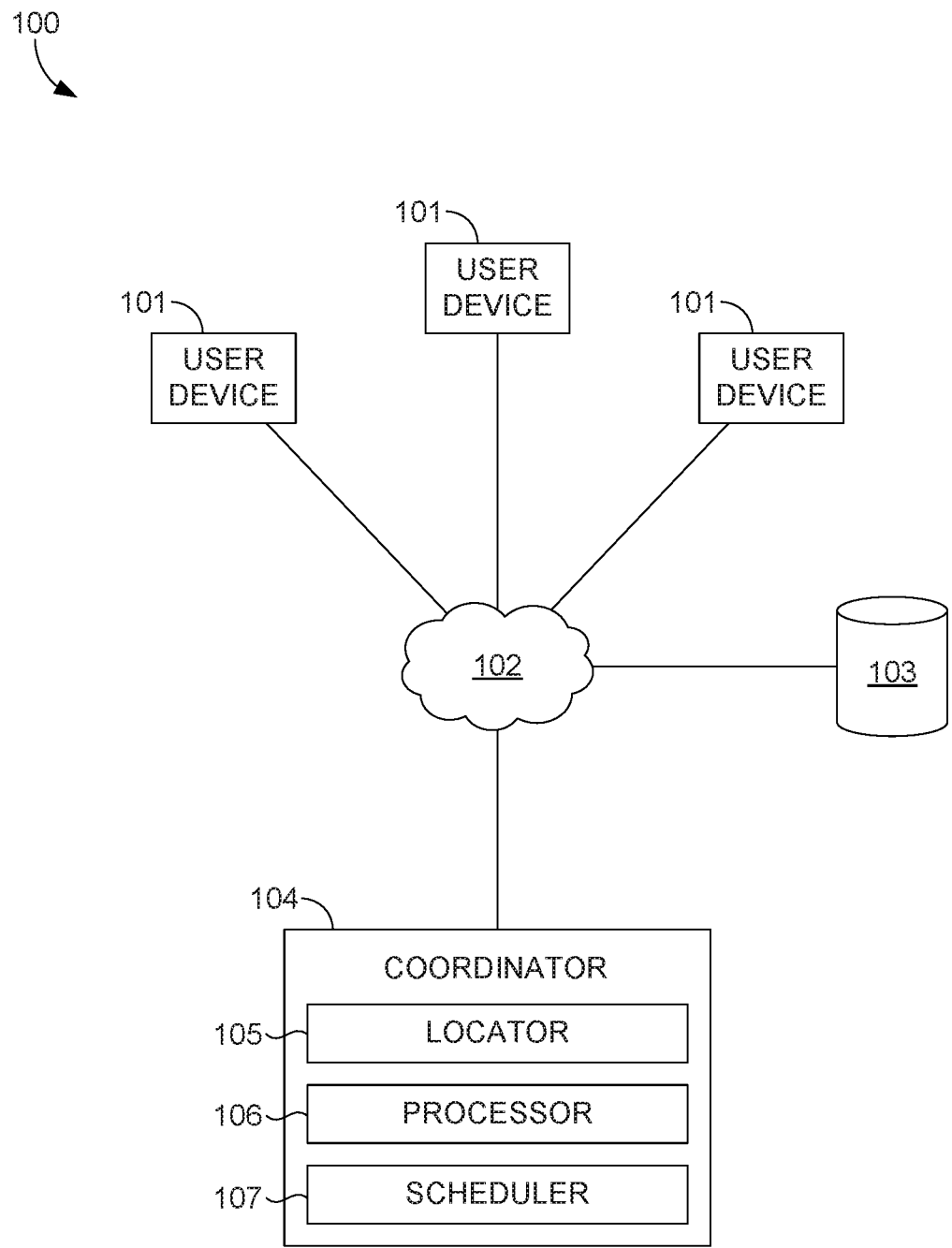
FIG. 1 is a block diagram of an exemplary system architecture in which embodiments of the invention may be employed.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

While electronic scheduling systems provide many advantages and efficiencies over traditional scheduling methods, some drawbacks are present in current solutions. For instance, in a situation where multiple individuals need coordinated scheduling (e.g., coordinating siblings for annual pediatric appointments, coordinating a couple for infertility treatment, coordinating an organ donor/recipient transaction, etc.), typical scheduling systems require a scheduler to schedule one individual at a time and only launch one individual's workflow at a time. While doing so, other schedulers are able to schedule other individuals in slots that were meant to go with an intended coordination, but there is no implementation to facilitate such coordination. In reality, a scheduler must launch a locate function, locate a single individual at a time, complete a process for that individual, and then start over for another individual and hope that the additional needed time slots are still available. Typical scheduling and processing applications do not populate processes for multiple individuals.

Embodiments of the present technology address the technical challenge of interfacing scheduling applications with processing applications to populate processes for multiple individuals simultaneously. The challenges faced in current technology are two-fold: multiple individuals are not able to be selected at one time and multiple processes are not launched for multiple patients at the same time.

Generally, embodiments are directed to integrating applications such that multiple individuals are selected and processed simultaneously. A first aspect is directed to one or more computer storage media storing computer-useable instructions that, when used by one or more computing devices, causes the one or more computing devices to perform operations. The operations comprise: receiving at least one input parameter via a first user interface provided by a locator application; identifying a plurality of individuals corresponding to at least a portion of the at least one input parameter; providing, via the locator application, the plurality of individuals corresponding to the at least a portion of the at least one input parameter; identifying a set of individuals from the plurality of individuals, wherein the set of individuals comprises more than one individual; generating a plurality of scheduling options for the set of individuals; identifying a first scheduling option; and locking scheduling times associated with the first scheduling option until each individual of the set of individuals is processed.

A second aspect is directed to a method of coordinating processes for individuals. The method comprises: receiving at least one input parameter via a first user interface provided by a locator application; identifying a plurality of individuals corresponding to at least a portion of the at least one input parameter; providing, via the locator application, the plurality of individuals corresponding to the at least a portion of the at least one input parameter; identifying a set of individuals from the plurality of individuals, wherein the set of individuals comprises more than one individual; generating a plurality of scheduling options for the set of individuals; identifying a first scheduling option; and locking scheduling times associated with the first scheduling option until a process for each individual of the set of individuals is completed.

A third aspect is directed to one or more computer storage media storing computer-useable instructions that, when used by one or more computing devices, cause the one or more computing devices to perform operations. The operations comprise: receiving, via a first user interface provided by a first application, an indication of a plurality of individuals to be coordinated; generating scheduling options, wherein the scheduling options comprise a plurality of time slots to accommodate the plurality of individuals to be coordinated; identifying an indication of a first scheduling option including a first set of time slots; locking the first scheduling option including the first set of time slots; determining completion of a first process for a first individual of the plurality of individuals to be coordinated; and prompting completion of the first process for any remaining individuals of the plurality of individuals to be coordinated.

Referring to the drawings in general, and initially to FIG. 1, a block diagram is provided illustrating an exemplary environment 100 in which some embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

It should be understood that the system 100 shown in FIG. 1 is an example of one suitable computing system architecture. Each of the components shown in FIG. 1 may be implemented via any type of computing device. The components may communicate with each other via a network may include, without limitation, one or more local area networks (LANs) and/or wide area networks (WANs). Such networking environments are commonplace in offices, enterprise-wide computer networks, intranets, and the Internet. It should be understood that any number of the components shown in FIG. 1 may be employed within the system 100 within the scope of the present invention. Each may be implemented via a single device or multiple devices cooperating in a distributed environment. Additionally, other components not shown may also be included within the environment.

Among other components not shown, the system 100 includes a variety user devices, such as user device 101, a database 103, and a coordinator 104, any of which can interact with any other component of the system 100 and each of which are communicatively coupled with each other. These components may communicate with each other via networking means (e.g., network 102) which may include, without limitation, one or more local area networks (LANs) and/or wide area networks (WLANs). In exemplary implementations, such networks comprise the Internet and/or cellular networks, amongst any of a variety of possible public and/or private networks.

User device 101 may comprise any type of computing device capable of use by a user. By way of example and not limitation, a user device may be embodied as a personal computer (PC), a laptop computer, a device, a smartphone, a tablet computer, a smart watch, a wearable computer, a fitness tracker, a personal digital assistant (PDA) device, a global positioning system (GPS) or device, a video player, a handheld communications device, an embedded system controller, a camera, a remote control, a consumer electronic device, a workstation, or any combination of these delineated devices, a combination of these devices, or any other suitable computer device.

Coordinator 104 may include a locator 105, a processor 106, and a scheduler 107. Additionally, coordinator 104 may comprise a database or be in communication with a separate database, such as database 103.

Figure 2:
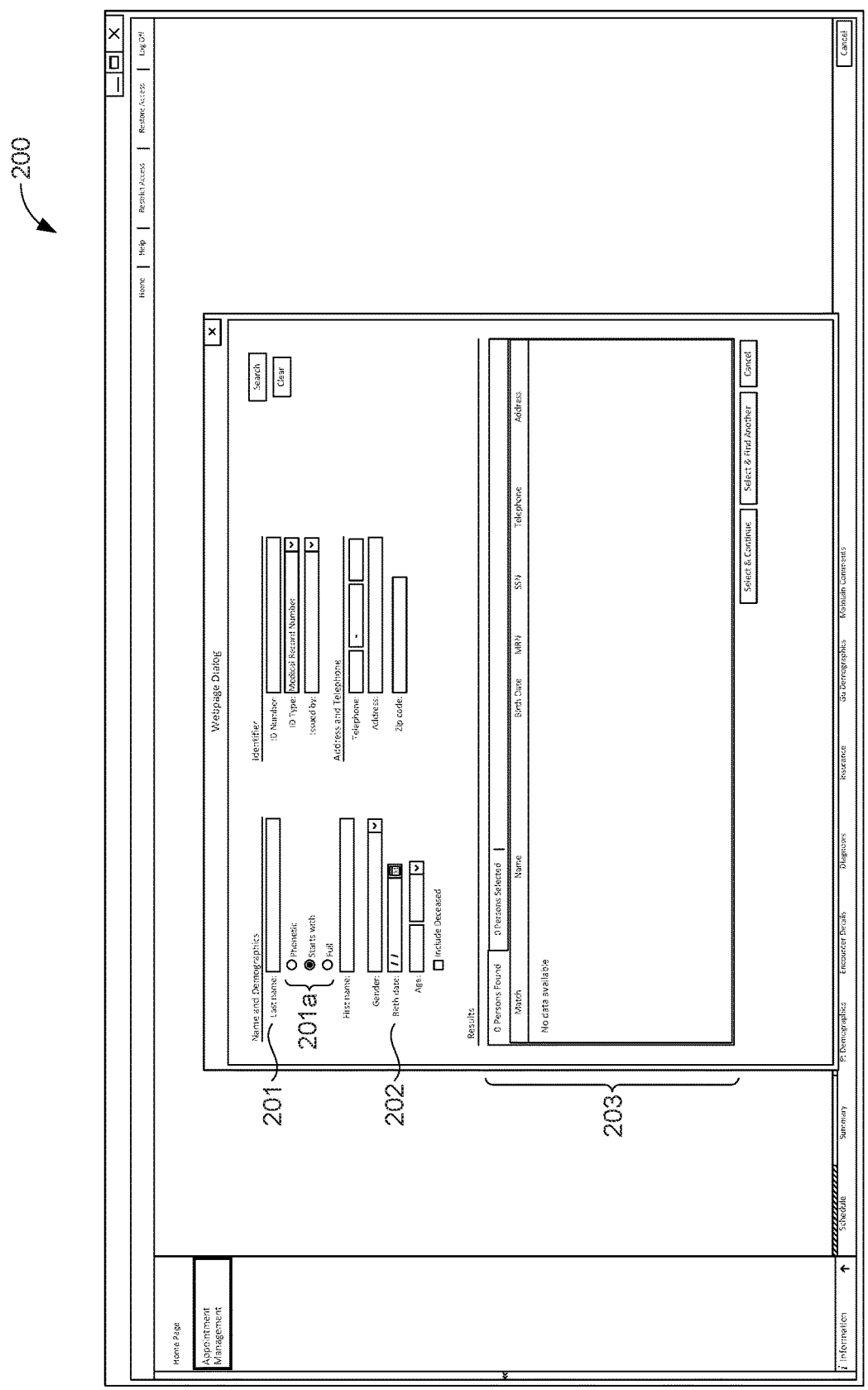
FIG. 2 is a screenshot showing a user interface for searching for individuals in accordance with an embodiment of the present invention.

As previously mentioned, the present environment 100 allows for the selection of multiple individuals at one time and the completion of separate processes for each of the multiple individuals from within the same workflow, as will be further illustrated herein. The initial solution allows for selection of multiple individuals at the same time. The locator 105 may be configured to identify at least one input/search parameter to identify multiple individuals satisfying the input parameter. The input parameter(s) may be a portion of an individual's name, an identification number, an address, a telephone number, a zip code, a medical record number, a birth data, an age, or the like. An exemplary input/search parameter interface 200 is provided in FIG. 2. As shown, there is a last name search input area 201 with a narrowing option area 201a providing for several options to filter the search parameter. A birth date search area 202 is provided, as well. Additionally, a results area 203 is illustrated. The results area 203 may provide a plurality of individuals that match said input criteria.

Figure 3:
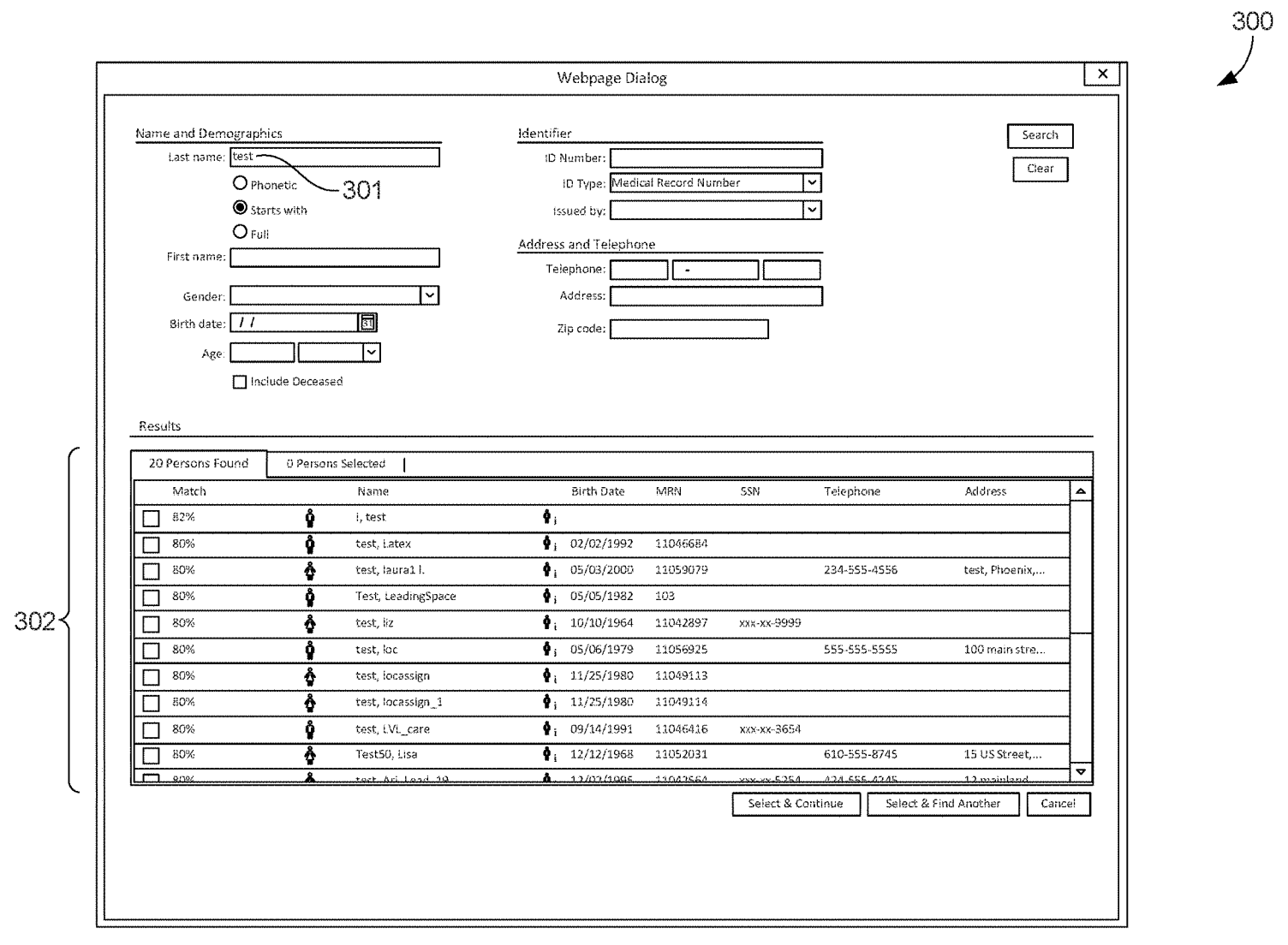

Upon input of the parameter(s), the locator 105 may identify a plurality of individuals that satisfy the parameter(s), as shown in illustrative user interface 300 of FIG. 3. User interface 300 includes a search parameter 301 (e.g., last name "test") and a results area 302 that includes a plurality of individuals satisfying the search parameter 301. As shown, no individuals are selected in the results area 302 as evidenced by a lack of selections (e.g., check marks) in the selectable indicators for each individual. Furthermore, the headings of the results area 302 indicate that 20 Individuals were found as a potential match and 0 Individuals have been selected.

Figure 4:
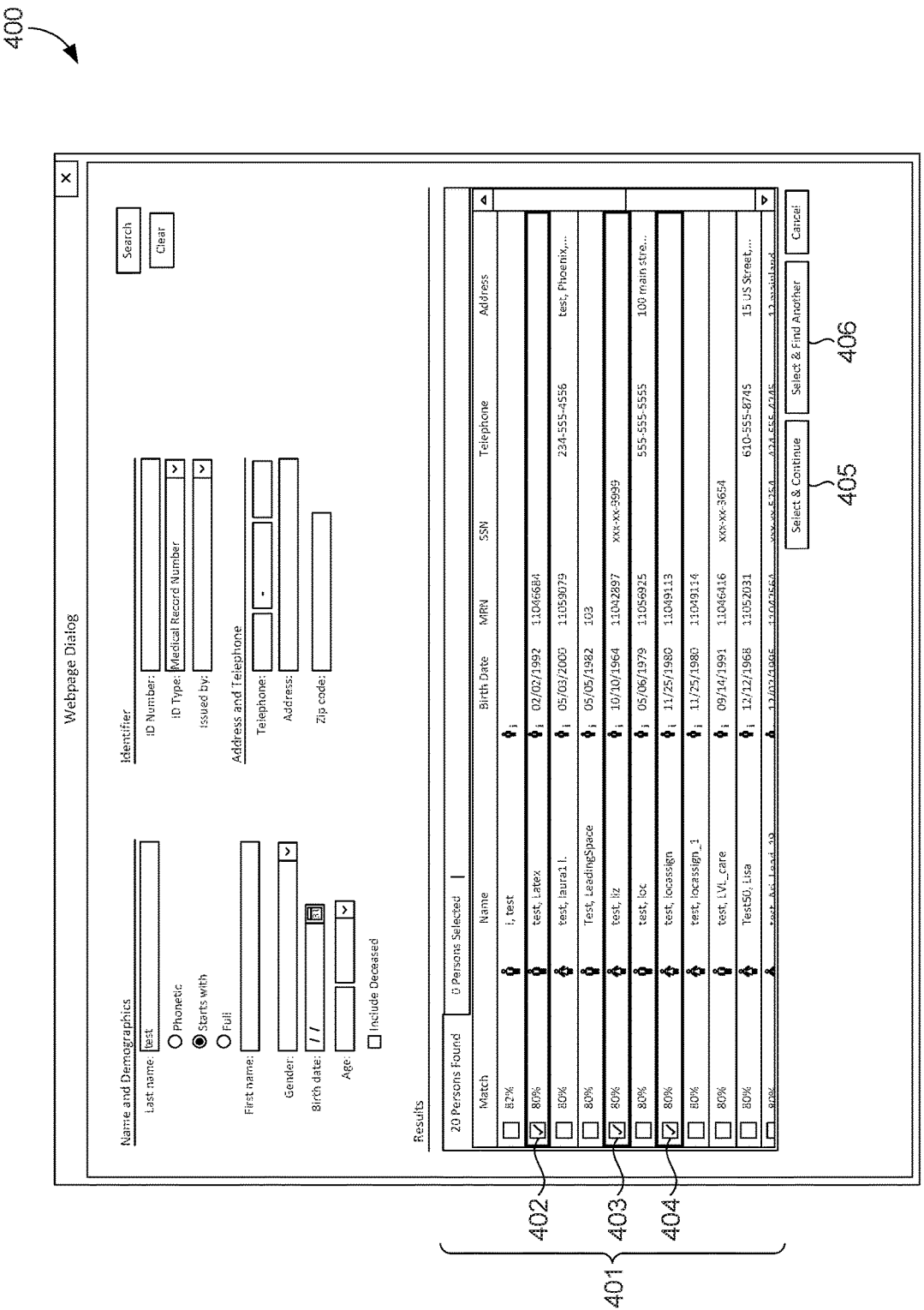
FIG. 4 is a screenshot showing a user interface for selecting more than one individual in accordance with an embodiment of the present invention.
Figure 5:
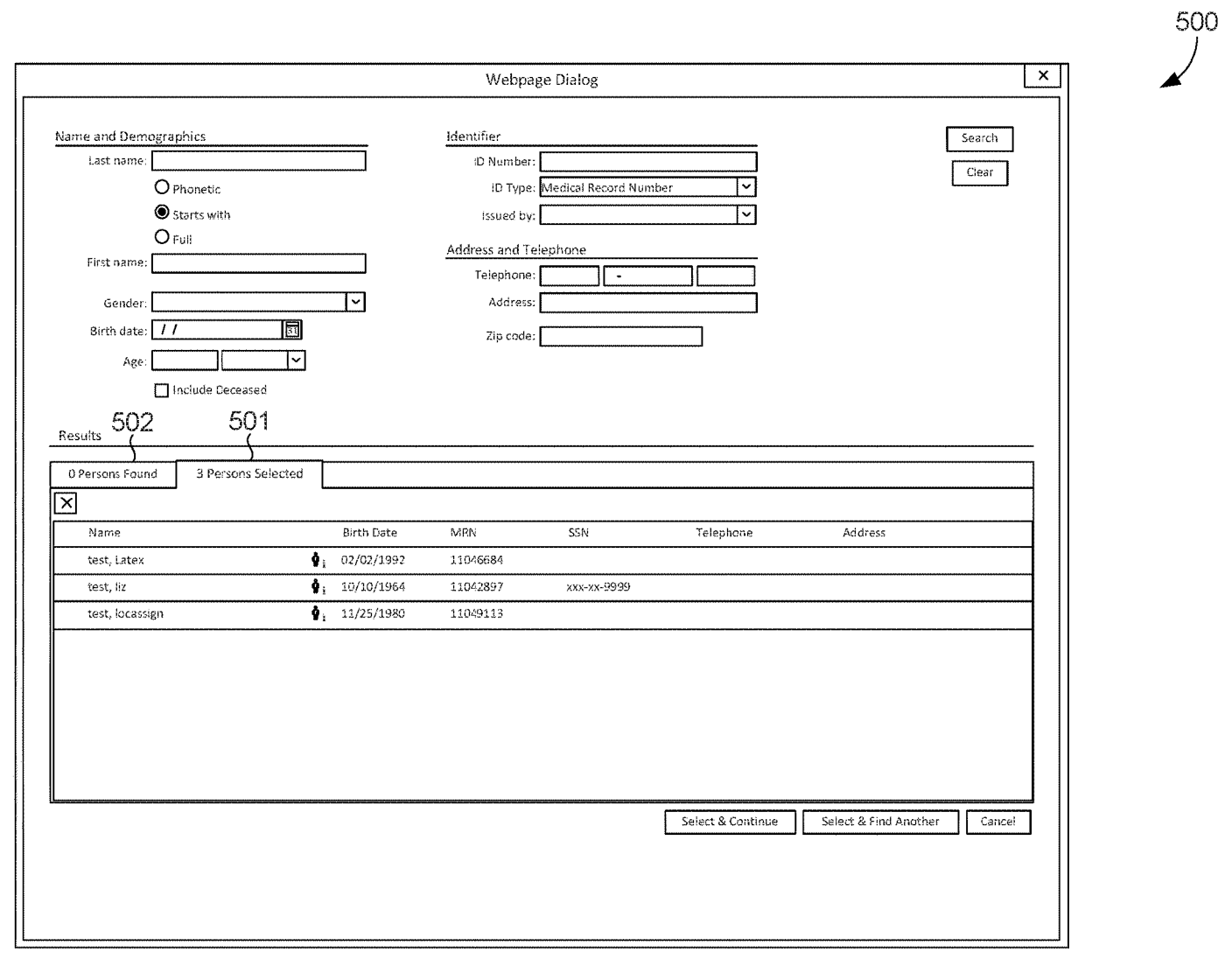

Once the results have been identified, multiple individuals may be selected at once, as shown in user interface 400 of FIG. 4. As illustrated, selection 402, selection 403, and selection 404 are each present in results area 401. Once selected, the option exists to continue at indicator 405 or find another at indicator 406. Upon selection of indicator 405, a user is navigated to user interface 500 shown in FIG. 5. The three individuals that were selected in FIG. 4 are shown as being "3 Persons Selected" at the selection area 501. As no other search has been originated, the interface 500 also illustrates that 0 Persons have been found at indicator 502.

Figure 6:
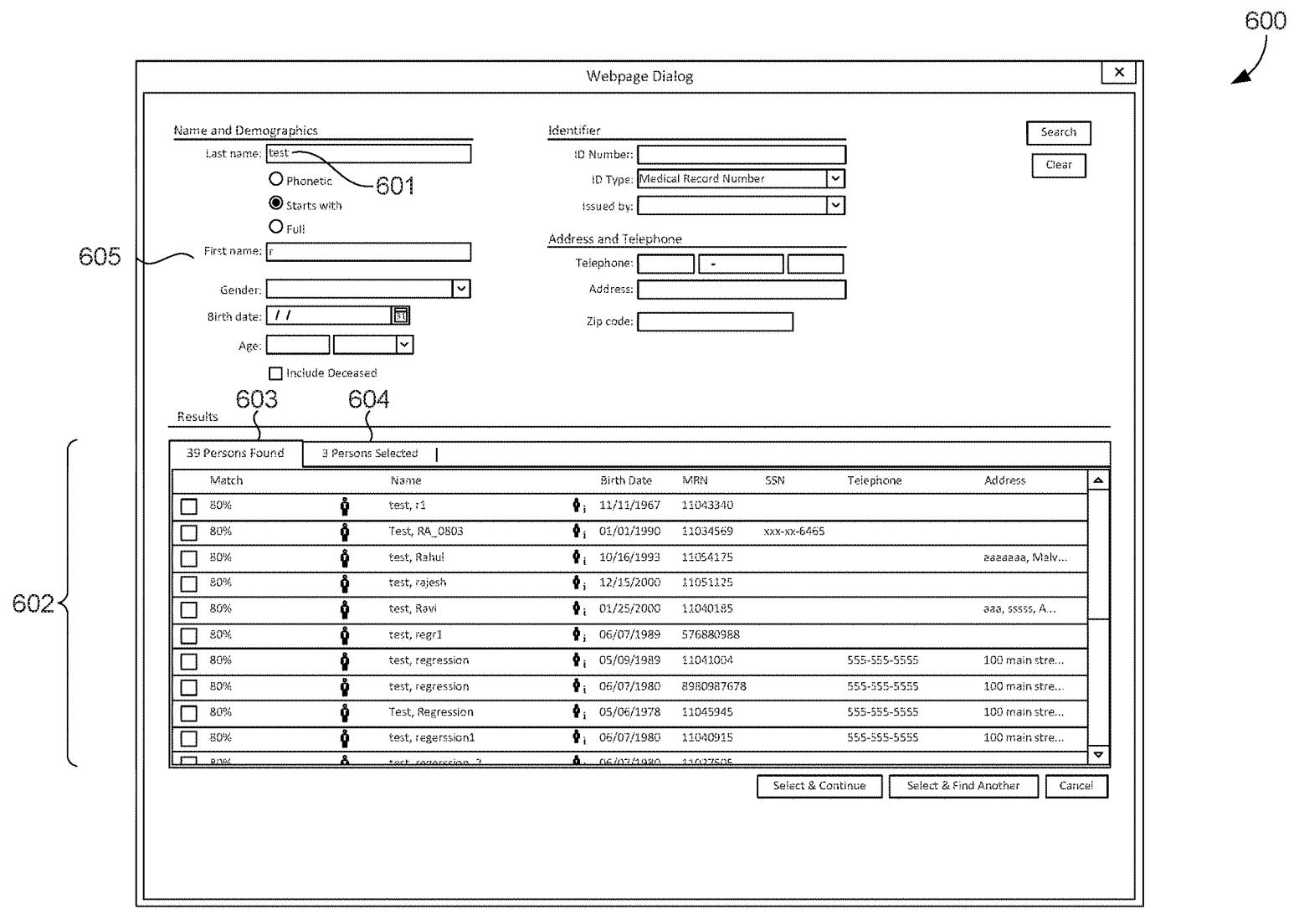
Figure 7:
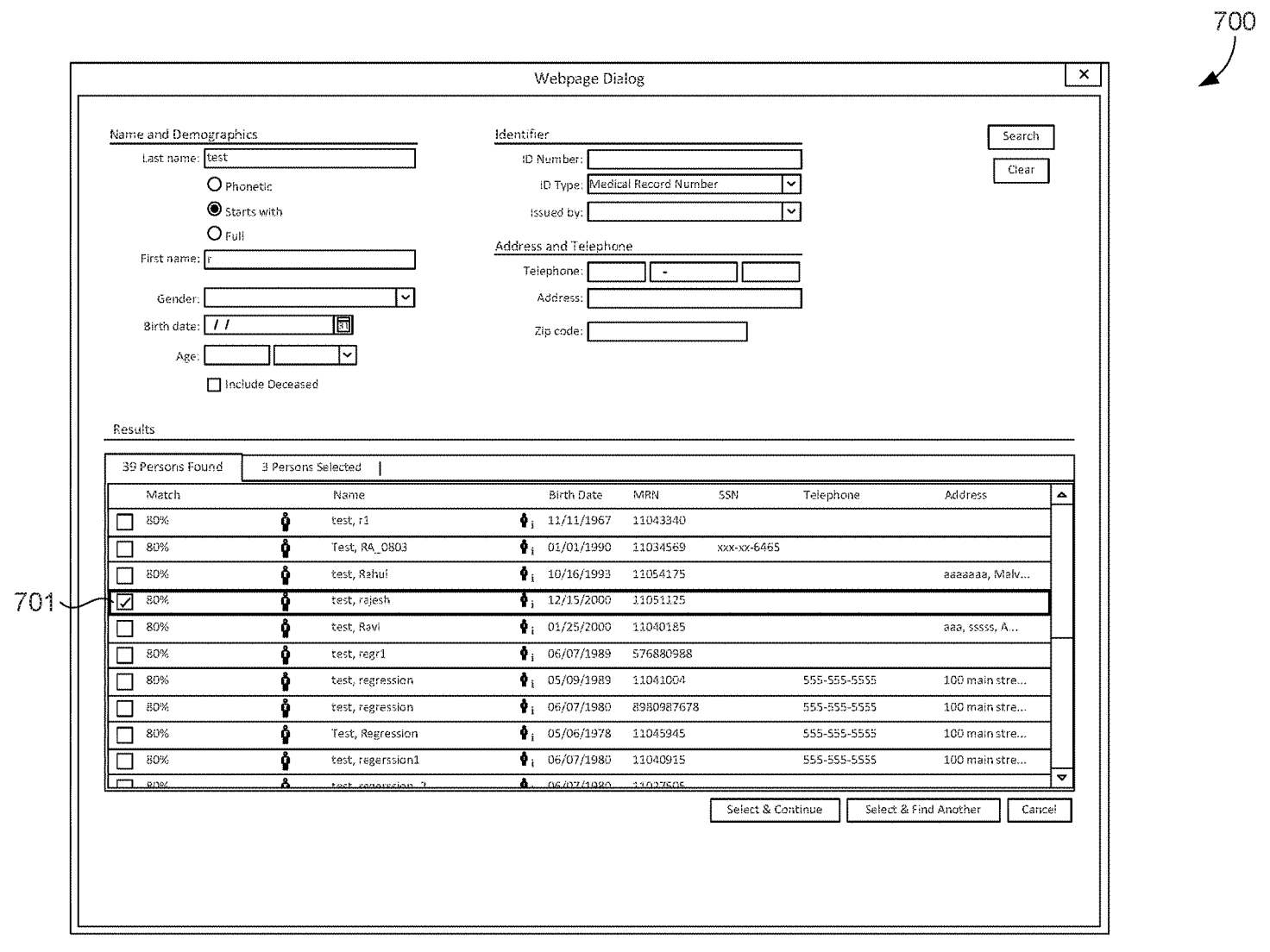

Alternatively, a user can select indicator 406 if they would like to make selections and continue searching for additional individuals. The indicator 406 allows a user to continue to search for additional individuals in the event that a desired individual is not present in the original results area 401. Selection of indicator 406 navigates a user to user interface 600 provided in FIG. 6. Here, a first input 601 is entered as well as a second input 605. This will further refine the results provided in the results area 602. The results area 602 is updated to reflect that 39 persons are found at indicator 603 with the additional inputs 601 and 605. Additionally, the three individuals that were previously selected remain selected as shown at indicator 604. A user can make an additional selection, as shown in user interface 700 of FIG. 7 as selection 701. While not shown, the selected area would update to 4 persons selected if the user continued.

Figure 8:
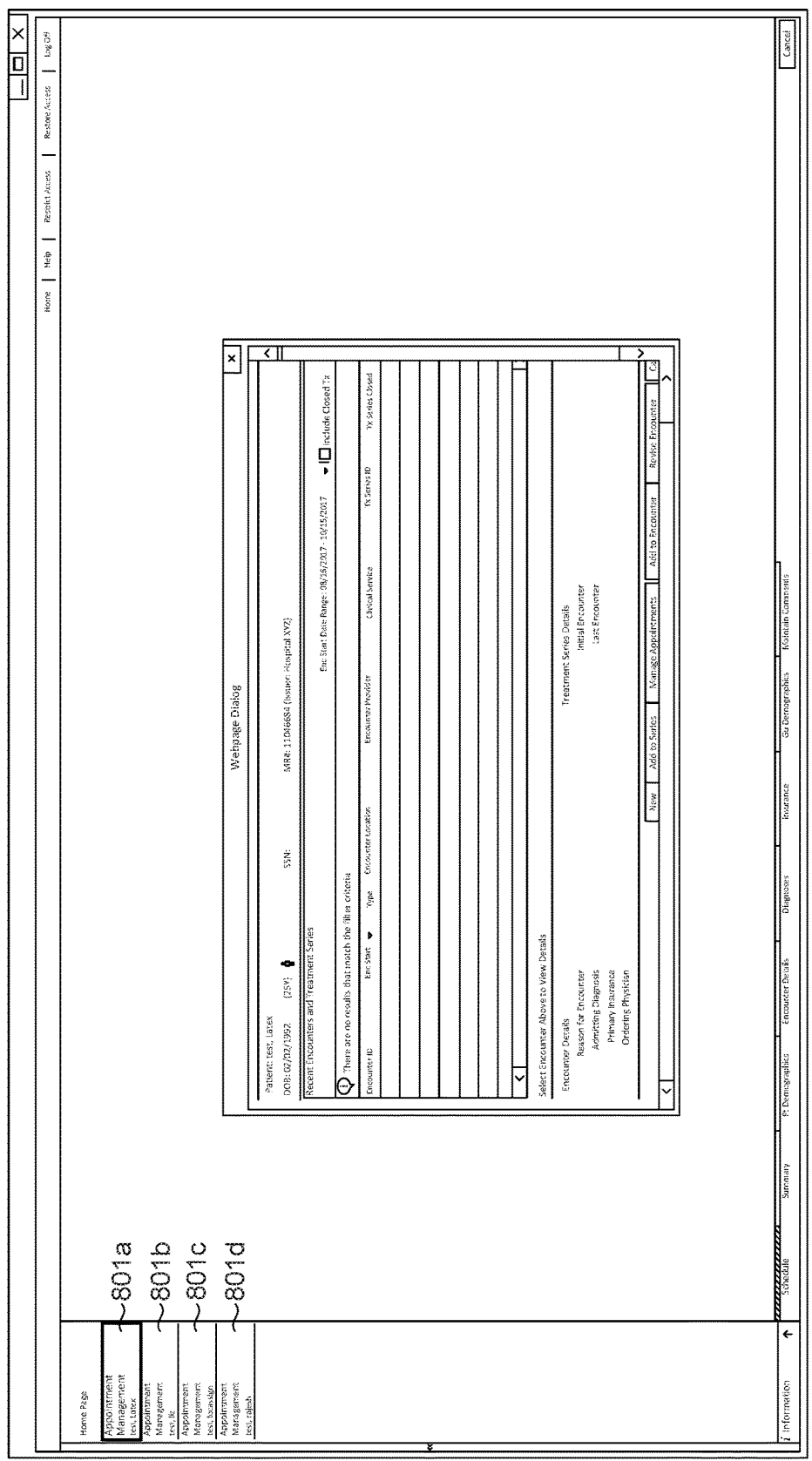
FIG. 8 is a screenshot showing a user interface for populating processes for individuals in accordance with an embodiment of the present invention.

Processor 106 may launch one or more processes for each selected individual. The processes may be launched and populated on a single interface, as shown in user interface 800 of FIG. 8. As shown, processes 801a, 801b, 801c, and 801d are each launched for each of the four individuals that were selected on previous screens. A process, as used herein, refers generally to an action to take with respect to an individual. Exemplary processes include, but are not limited to, checking in an individual, cancelling an appointment/encounter, rescheduling an appointment/encounter, admitting an individual, checking out an individual, etc.

Figure 9:
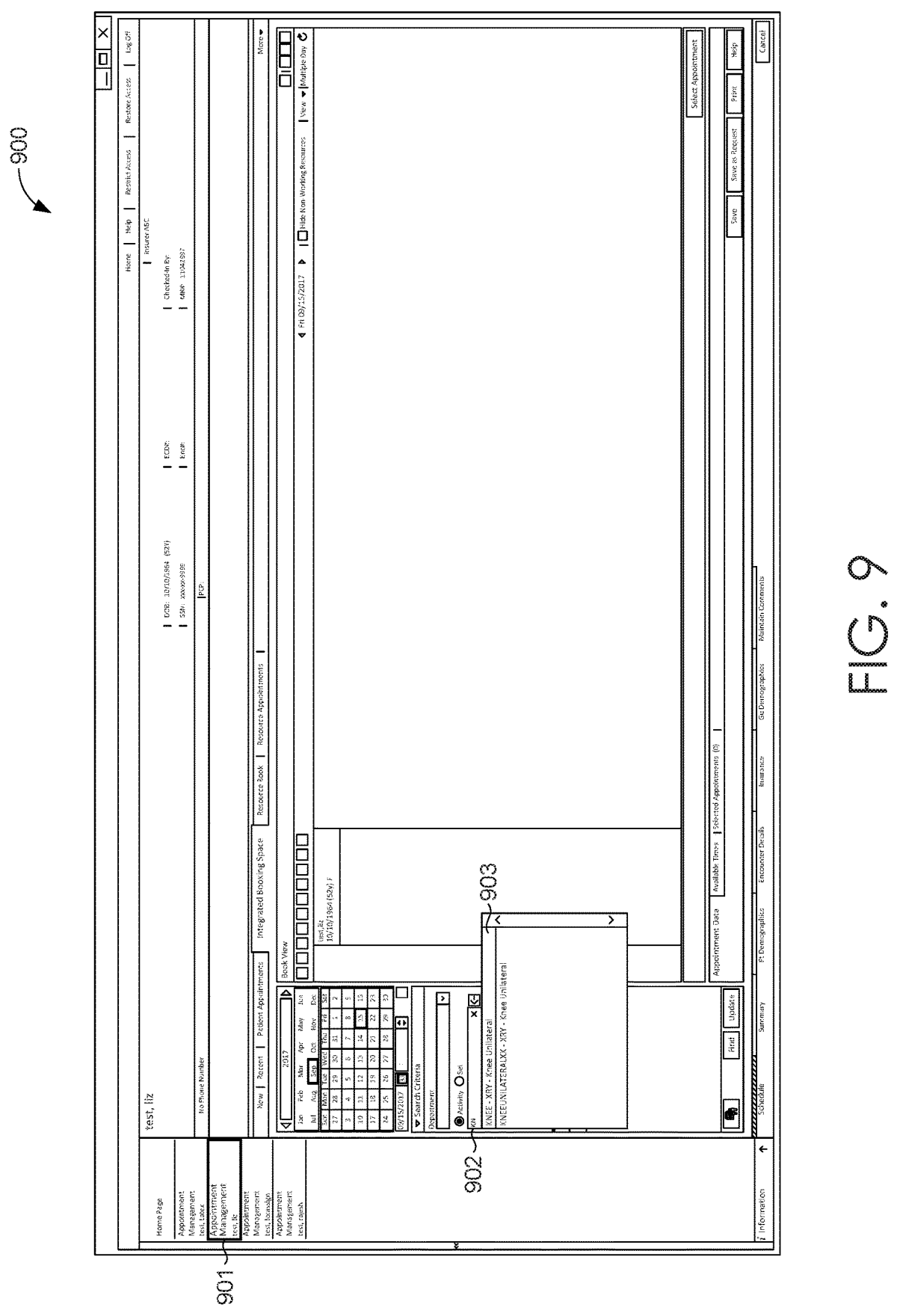

A process is entered for each individual and may be used in the coordination of multiple individuals. FIG. 9 illustrates an exemplary user interface 900 for entering processes. Here, the individual 901 is selected and a portion of a process 902 is input. A process option 903 may be selected from, for instance, a drop-down menu. A user would then go on to enter a process for any other individuals that are listed in the application workflow. Alternatively, processes may only be entered for those individuals that are desired to be coordinated together. Logical reasoning may be used by the processor 106 to generate scheduling options for the individuals to be coordinated. For instance, the processor 106 may identify that encounter X is typically associated with 30 minutes and can allocate that much time for that block. By way of further example, processor 106 may identify that a test (e.g., a CT with contrast) requires a wait period of X after administering the contrast before the test can be performed and build that time into the generated scheduling options.

Figure 10:
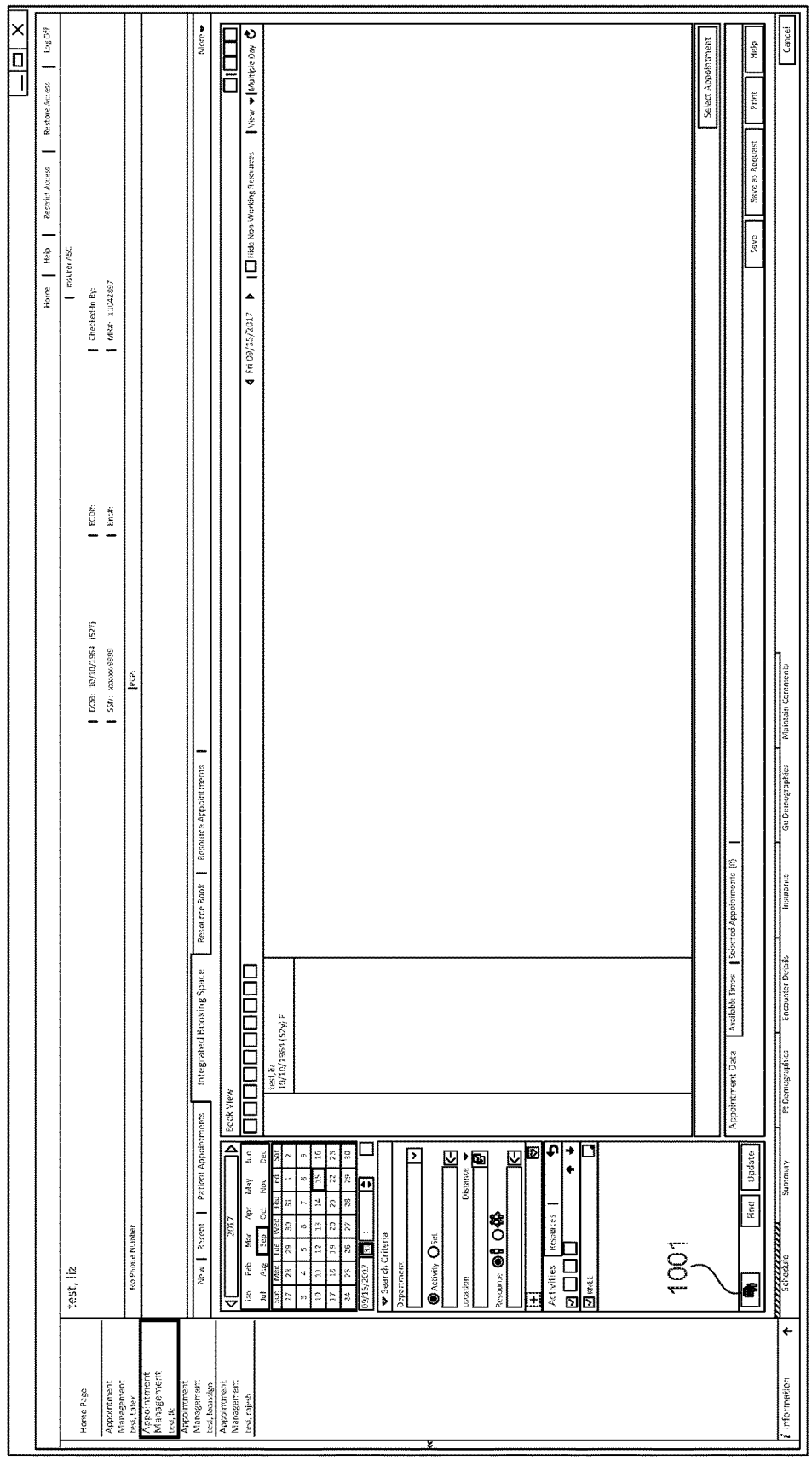
FIG. 10 is a screenshot showing a user interface for coordinating processes for individuals in accordance with an embodiment of the present invention.
Figure 11:
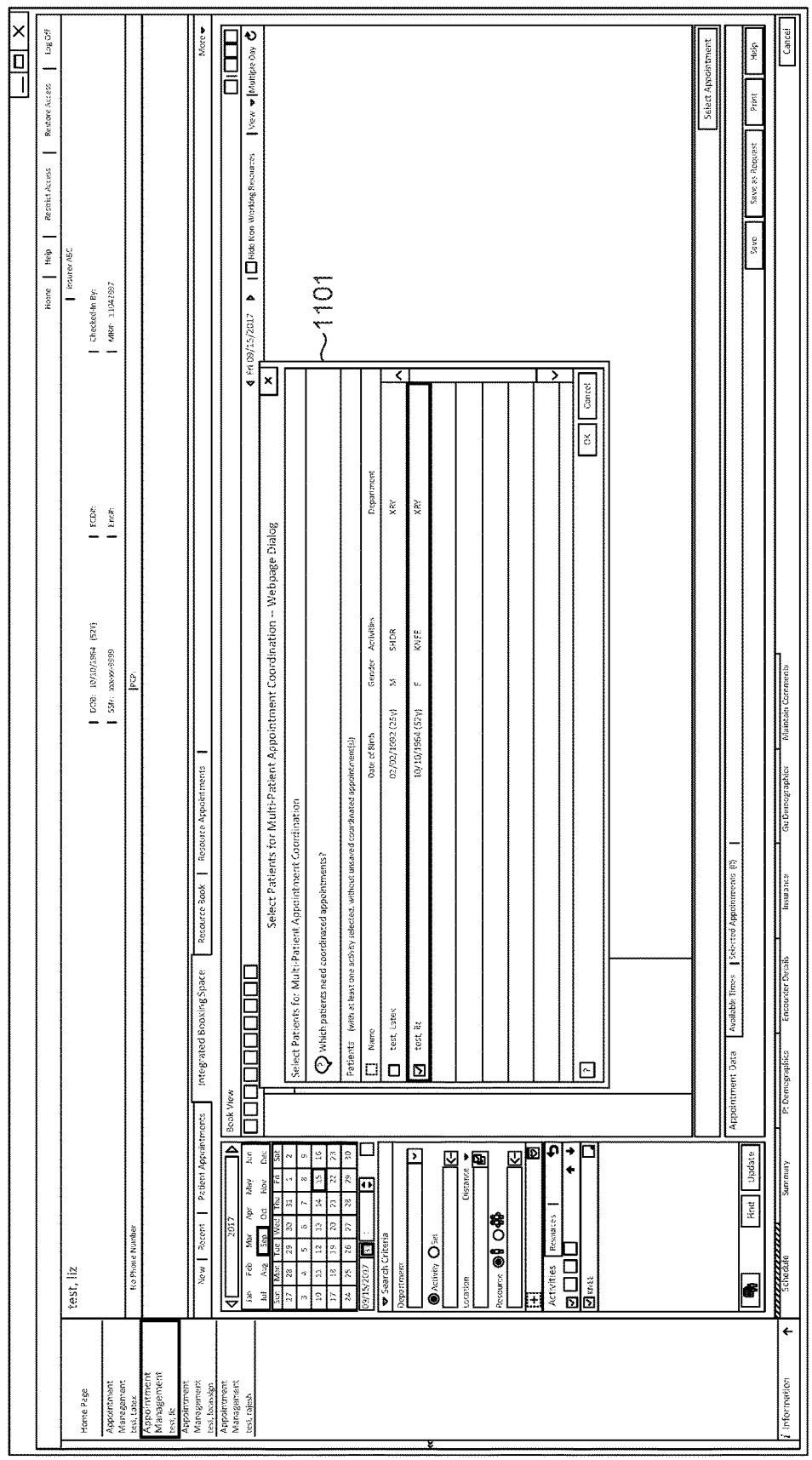
FIG. 11 is a screenshot showing a user interface for selecting individuals for coordination in accordance with an embodiment of the present invention.

Once the desired individuals to be coordinated have processes entered for use by the processor, a coordinate indicator 1001 may be selected (shown in user interface 1000 of FIG. 10). Selection of the coordinate indicator 1001 prompts display of a coordinate dialog 1101 (shown in user interface 1100 of FIG. 11) where each individual having a process entered is displayed for selection (or not) for coordination. Alternatively, one could individual schedule/process each individual without opting for coordination. Embodiments allow for selection of multiple individuals and launching of multiple processes for individual action, without requiring coordination of activities. Furthermore, additional embodiments allow for a set of individuals to be coordinated while, simultaneously, allowing at least one individual to remain separated such that individual action can be taken on that individual while still launching a process for that separated individual at the same time as those that are selected for coordination.

Figure 12:
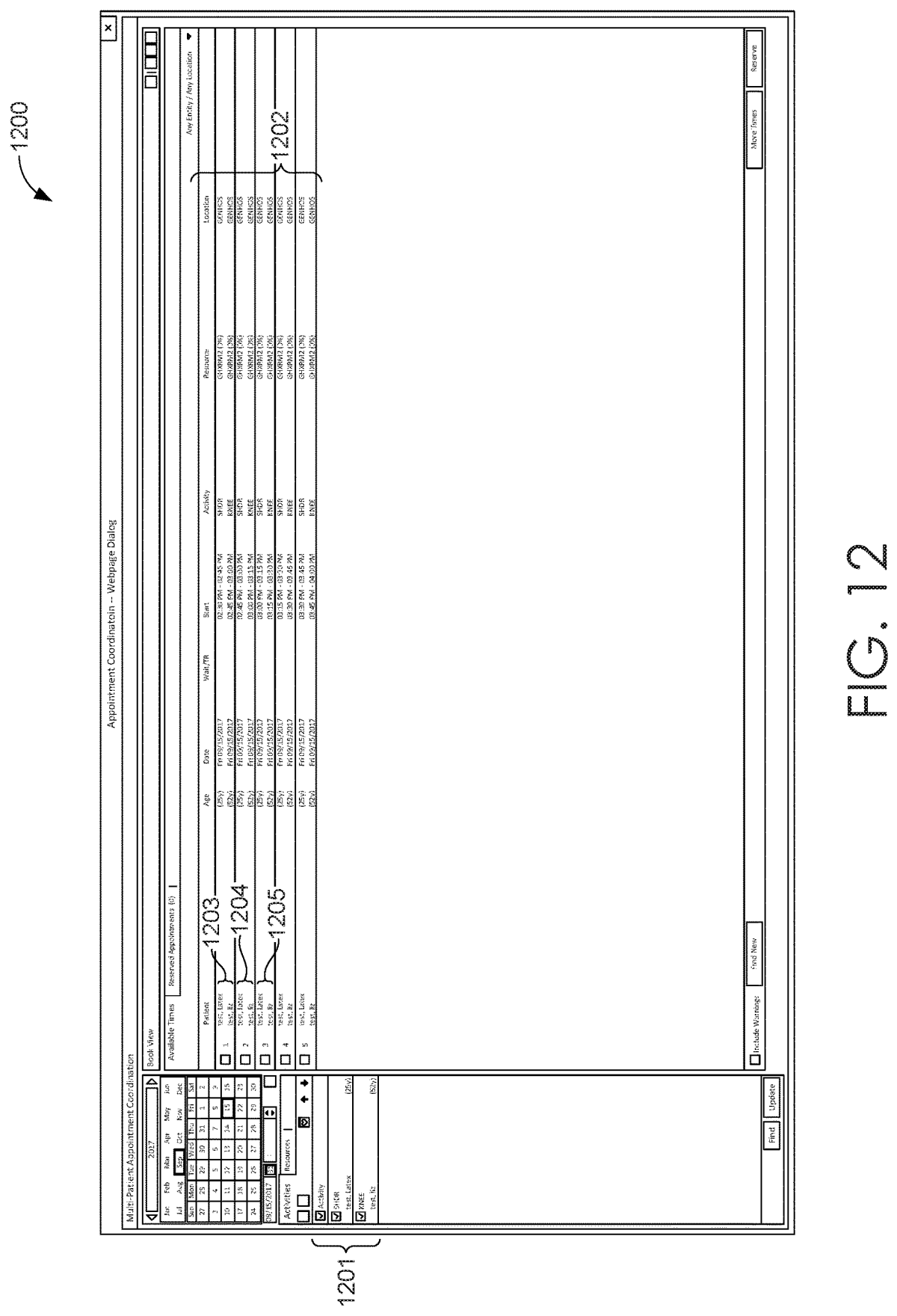

Upon entering the desired individuals for coordination, the processor 106 or the scheduler 107 may generate a plurality of scheduling options. FIG. 12 provides a scheduling option interface 1200. Area 1201 indicates the selected individuals and associated processes/activities to be coordinated. Area 1202 includes options 1203, 1204, and 1205. Additional information used to generate the scheduling option interface 1200 may include a location needed for the encounter, a resource utilized for the encounter (e.g., a clinician), a device needed for the encounter (e.g., CT machine), and the like.

The options provided may include consecutive or overlapping options, where applicable. For instance, options cannot overlap if they require the same location, same resource, or same device (e.g., individual A cannot be scheduled at 2:30 for an X-ray while individual B is scheduled at 2:30 for X-ray if there is only one X-ray machine).

Figure 13:
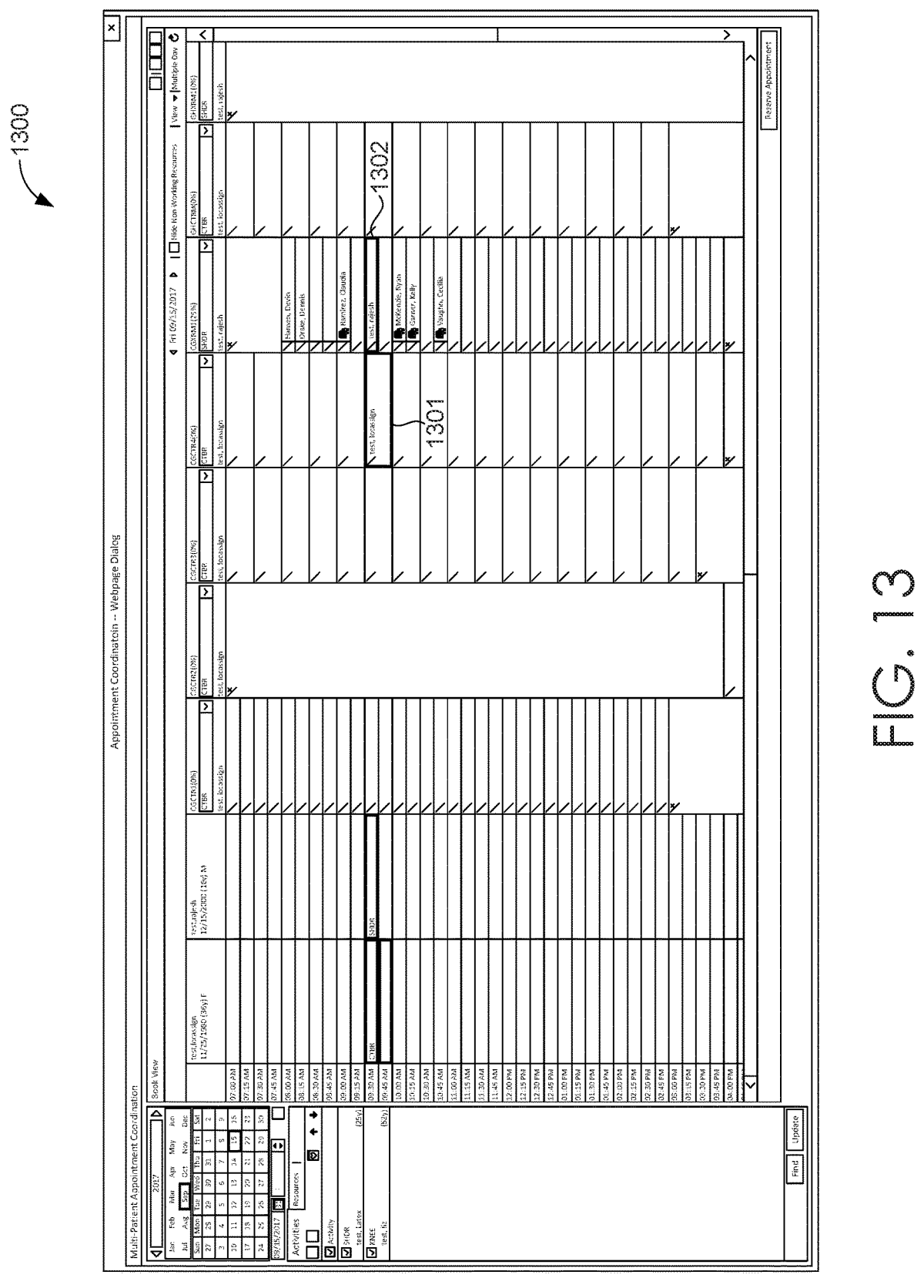

In the options provided in interface 1200, the resource and location are both the same and, as such, the options provided are not overlapping. Coordinating three individuals who, for instance, all see a different health services provider, may all be scheduled at the same time since they utilize different resources. User interface 1300 of FIG. 13 provides an alternative book view of scheduling options. Options 1301 and 1302 are shown in the book view interface 1300.

Once a desired option is indicated, a user can opt to reserve the option (see FIG. 12 reserve indicator). The reserve indicator causes the processor 106 to lock each time slot within the selected scheduling option until satisfaction of configurable criteria is met. The configurable criteria may include a predetermined time period (e.g., 25 minutes), completion of a process for each of the selected coordinated individuals, or the like. Thus, this allows a user to complete a process (e.g., scheduling appointments) for each coordinated individual before the slots are unlocked to other users.

In addition to locking the selected options, the processor 106 may prompt a user to apply an action to any other individual in the coordinated group. For instance, assuming a process (e.g., checking in an individual) has been completed with Individual A (who is associated with Individuals B and C), the processor 106 prompts the user, via dialog 1400 provided in FIG. 14, to complete the task that was just processed for Individual A with the other individuals that are part of the coordinated effort.

Embodiments also provide for indicators that note when individuals are part of a coordinated group. FIG. 15 provides dialog 1500 that illustrates coordinate indicator 1502 that shows an individual is part of a coordinated group. The coordinate indicator 1502 is selectable such that selection thereof navigates a user to dialog 1600 of FIG. 16 that illustrates all other individuals/appointments that are associated with the coordinate indicator 1502 of FIG. 15.

Figure 17:
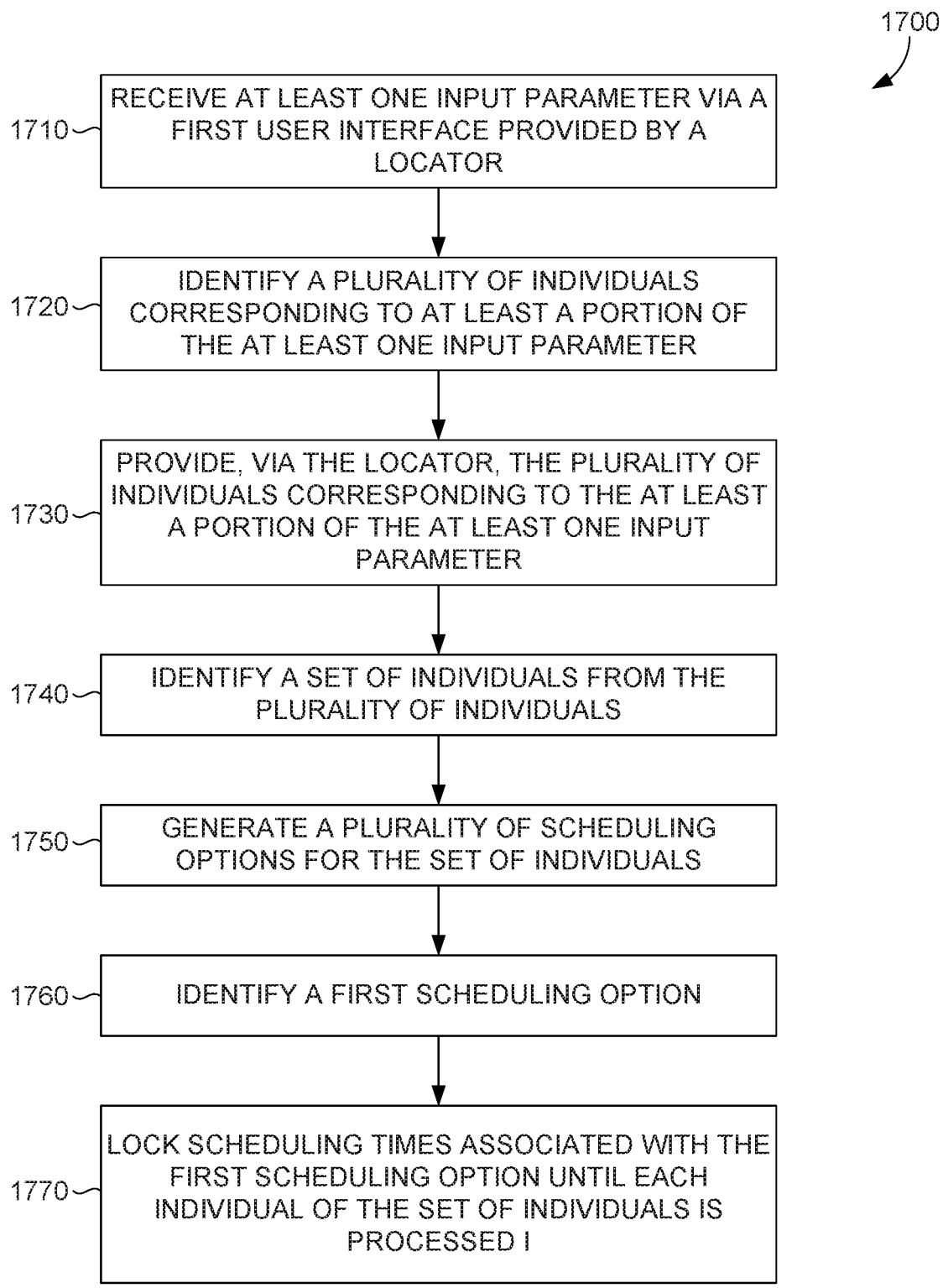
FIG. 17 is a flow diagram showing a first method for coordinating individuals in accordance with an embodiment of the present invention.

Turning now to FIG. 17, a flow diagram is provided showing a method 1700 in accordance with some embodiments of the present invention. Initially, at block 1710, at least one input parameter is received via a first user interface provided by a locator. At block 1720, a plurality of individuals corresponding to at least a portion of the at least one input parameter is identified. At block 1730, the plurality of individuals corresponding to the at least a portion of the at least one input parameter is provided via the locator. At block 1740, a set of individuals from the plurality of individuals is identified. The set of individuals may be identified based on a user selection of the set of individuals. At block 1750, a plurality of scheduling options for the set of individuals is generated. At block 1760, a first scheduling option is identified. The first scheduling option may be identified based on a user selection of the first scheduling option. At block 1770, scheduling times associated with the first scheduling option are locked until each individual of the set of individuals is processed.

Figure 18:
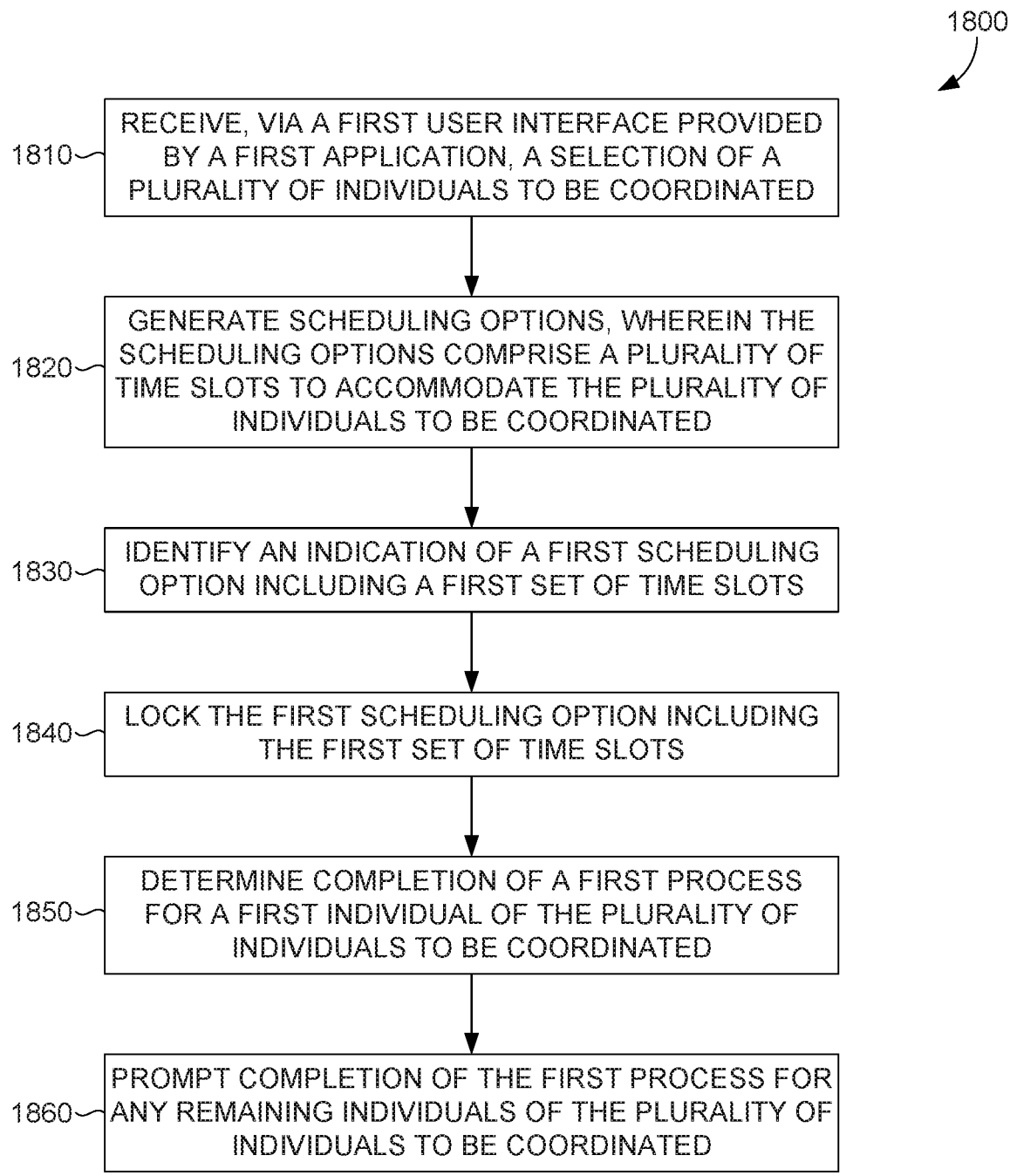
FIG. 18 is a flow diagram showing a second method for coordinating individuals in accordance with an embodiment of the present invention.

Turning now to FIG. 18, a flow diagram is provided showing a method 1800 in accordance with some embodiments of the present invention. Initially, at block 1810, a selection of a plurality of individuals to be coordinated is received via a first user interface provided by a first application. The first application may be the locator 105 of FIG. 1. At block 1820, scheduling options are generated, wherein the scheduling options comprise a plurality of time slots to accommodate the plurality of individuals to be coordinated. At block 1830, an indication of a first scheduling option including a first set of time slots is identified. At block 1840, the first scheduling option including the first set of time slots is locked. Locked, as used herein, refers generally to preserving the time slots for a current user and preventing other users from accessing the locked content. At block 1850, completion of a first process for a first individual of the plurality of individuals to be coordinated is determined and, at block 1860, a prompt for completion of the first process for any remaining individuals of the plurality of individuals to be coordinated is provided.

Having described embodiments of the present invention, an exemplary operating environment in which embodiments of the present invention may be implemented is described below in order to provide a general context for various aspects of the present invention. The exemplary computing system environment on which embodiments of the present invention may be implemented is illustrated and designated generally as reference numeral 1900 in FIG. 19. It will be understood and appreciated by those of ordinary skill in the art that the illustrated computing system environment 1900 is merely an example of one suitable computing environment and is not intended to suggest any limitation as to the scope of use or functionality of the invention. Neither should the computing system environment 1900 be interpreted as having any dependency or requirement relating to any single component or combination of components illustrated therein.

The present invention may be operational with numerous other general purpose or special purpose computing system environments or configurations. Examples of well-known computing systems, environments, and/or configurations that may be suitable for use with the present invention include, by way of example only, personal computers, server computers, handheld or laptop devices, multiprocessor systems, microprocessor-based systems, set top boxes, programmable consumer electronics, network PCs, minicomputers, mainframe computers, distributed computing environments that include any of the above-mentioned systems or devices, and the like.

The present invention may be described in the general context of computer-executable instructions, such as program modules, being executed by a computer. Generally, program modules include, but are not limited to, routines, programs, objects, components, and data structures that perform particular tasks or implement particular abstract data types. The present invention may also be practiced in distributed computing environments where tasks are performed by remote processing devices that are linked through a communications network. In a distributed computing environment, program modules may be located in local and/or remote computer storage media including, by way of example only, memory storage devices.

Figure 19:
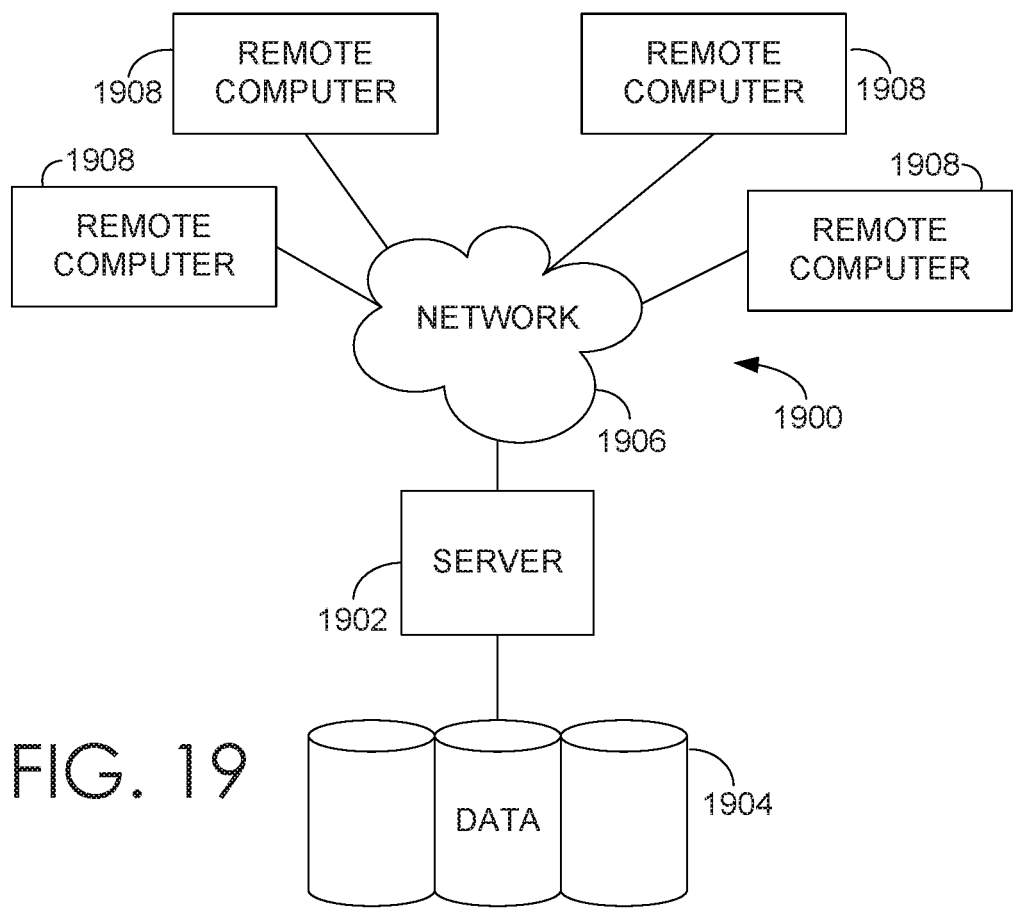
FIG. 19 is a block diagram of an exemplary computing environment suitable for use in implementing the present invention.

With continued reference to FIG. 19, the exemplary computing system environment 1900 includes a general purpose computing device in the form of a server 1902. Components of the server 1902 may include, without limitation, a processing unit, internal system memory, and a suitable system bus for coupling various system components, including database cluster 1904, with the server 1902. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The server 1902 typically includes, or has access to, a variety of computer readable media, for instance, database cluster 1904. Computer readable media can be any available media that may be accessed by server 1902, and includes volatile and nonvolatile media, as well as removable and non-removable media. By way of example, and not limitation, computer readable media may include computer storage media and communication media. Computer storage media may include, without limitation, volatile and non-volatile media, as well as removable and nonremovable media implemented in any method or technology for storage of information, such as computer readable instructions, data structures, program modules, or other data. In this regard, computer storage media may include, but is not limited to, RAM, ROM, EEPROM, flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the server 1902. Computer storage media does not comprise signals per se. Communication media typically embodies computer readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer readable media.

The computer storage media discussed above and illustrated in FIG. 19, including database cluster 1904, provide storage of computer readable instructions, data structures, program modules, and other data for the server 1902.

The server 1902 may operate in a computer network 1906 using logical connections to one or more remote computers 1908. Remote computers 1908 may be located at a variety of locations in a medical or research environment, for example, but not limited to, clinical laboratories, hospitals and other inpatient settings, veterinary environments, ambulatory settings, medical billing and financial offices, hospital administration settings, home health care environments, and clinicians' offices. Clinicians may include, but are not limited to, a treating physician or physicians, specialists such as surgeons, radiologists, cardiologists, and oncologists, emergency medical technicians, physicians' assistants, nurse practitioners, nurses, nurses' aides, pharmacists, dieticians, microbiologists, laboratory experts, genetic counselors, researchers, veterinarians, students, office assistants and the like. The remote computers 1908 may also be physically located in non-traditional medical care environments so that the entire health care community may be capable of integration on the network. The remote computers 1908 may be personal computers, servers, routers, network PCs, peer devices, other common network nodes, or the like, and may include some or all of the components described above in relation to the server 1902. The devices can be personal digital assistants or other like devices.

Exemplary computer networks 1906 may include, without limitation, local area networks (LANs) and/or wide area networks (WANs). Such networking environments are commonplace in offices, enterprise-wide computer networks, intranets, and the Internet. When utilized in a WAN networking environment, the server 1902 may include a modem or other means for establishing communications over the WAN, such as the Internet. In a networked environment, program modules or portions thereof may be stored in the server 1902, in the database cluster 1904, or on any of the remote computers 1908. For example, and not by way of limitation, various application programs may reside on the memory associated with any one or more of the remote computers 1908. It will be appreciated by those of ordinary skill in the art that the network connections shown are exemplary and other means of establishing a communications link between the computers (e.g., server 1902 and remote computers 1908) may be utilized.

In operation, a user may enter commands and information into the server 1902 or convey the commands and information to the server 1902 via one or more of the remote computers 1908 through input devices, such as a keyboard, a pointing device (commonly referred to as a mouse), a trackball, or a touch pad. Other input devices may include, without limitation, microphones, satellite dishes, scanners, or the like. Commands and information may also be sent directly from a remote healthcare device to the server 1902. In addition to a monitor, the server 1902 and/or remote computers 1908 may include other peripheral output devices, such as speakers and a printer.

Although many other internal components of the server 1902 and the remote computers 1908 are not shown, those of ordinary skill in the art will appreciate that such components and their interconnection are well known. Accordingly, additional details concerning the internal construction of the server 1902 and the remote computers 1908 are not further disclosed herein.

As can be understood, embodiments of the present invention provide systems and methods for coordinating processes for multiple individuals. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated and within the scope of the claims.

What is claimed is:

1. One or more non-transitory computer storage media storing computer-useable instructions that, when used by one or more computing devices, cause the one or more computing devices to perform operations for addressing a technical challenge of interfacing scheduling applications with processing applications to populate processes for individuals concurrently, the media comprising:

receiving an input parameter via a graphical user interface provided by a first instance of a locator application;

identifying a plurality of individuals corresponding to the input parameter;

providing, via the locator application, the plurality of individuals identified as corresponding to the input parameter;

causing display of the plurality of individuals identified as corresponding to the input parameter in the graphical user interface, as responsive to the input parameter;

identifying a set of individuals within the plurality of individuals identified, wherein the set of individuals comprises more than one individual;

generating a plurality of scheduling options for the set of individuals, wherein all of the plurality of scheduling options occur on the same date;

causing display of the plurality of scheduling options for the set of individuals in the graphical user interface, as responsive to the set of individuals identified;

identifying a first scheduling option selected in the graphical user interface from the plurality of scheduling options for the set of individuals for scheduling one of the individuals in the set of individuals;

in response to identifying the first scheduling option selected for scheduling one of the individuals in the set of individuals, concurrently locking all of the plurality of scheduling options generated for the set of individuals, wherein other users are prevented, by the locking, from selecting the plurality of scheduling options in other instances of the locator application until processing is completed by identifying one scheduling option in the plurality of scheduling options for each individual in the set of individuals and scheduling each individual in the set of individuals in the one scheduling option of the plurality of scheduling options in the first instance of the locator application;

for each remaining individual in the set of individuals, identifying one scheduling option in the plurality of scheduling options in the first instance of the locator application; and launching a plurality of concurrent processes in the first instance of the locator application, wherein the plurality of concurrent processes schedule each individual in the set of individuals in the one corresponding scheduling option identified, and wherein the plurality of scheduling options remain locked until processing of the plurality of concurrent processes is completed.

2. The one or more computer storage media of claim 1, wherein the input parameter is at least a portion of an individual's name.

3. The one or more computer storage media of claim 1, wherein the plurality of scheduling options is generated based on a resource associated with each individual of the set of individuals.

4. The one or more computer storage media of claim 3, wherein the resource comprises a professional, a location, or a device.

5. The one or more computer storage media of claim 1, wherein the plurality of scheduling options includes a plurality of overlapping time slots on the same date.

6. The one or more computer storage media of claim 1, wherein the plurality of scheduling options includes a plurality of consecutive time slots on the same date.

7. The one or more computer storage media of claim 1, wherein the plurality of scheduling options includes one or more of overlapping time slots or consecutive time slots based on one or more resources associated with each individual of the set of individuals, wherein when each individual of the set of individuals is associated with a same resource the plurality of scheduling options includes the consecutive time slots, and wherein when each individual of the set of individuals is associated with different resources the plurality of scheduling options includes the overlapping time slots.

8. The one or more computer storage media of claim 1, wherein the scheduling options that are locked for a predetermined period of time.

9. A method for addressing a technical challenge of interfacing scheduling applications with processing applications to populate processes for individuals concurrently, the method comprising:

receiving at least one input parameter via a graphical user interface provided by a first instance of a locator application;

identifying a plurality of individuals corresponding to at least a portion of the at least one input parameter, the plurality of individuals corresponding to patients;

providing, via the locator application, the plurality of individuals corresponding to the at least a portion of the at least one input parameter;

causing display of the plurality of individuals identified as corresponding to the input parameter in the graphical user interface, as responsive to the input parameter;

identifying a set of individuals from the plurality of individuals, wherein the set of individuals comprises more than one individual;

generating a plurality of scheduling options for the set of individuals, wherein all of the plurality of scheduling options occur on the same date;

causing display of the plurality of scheduling options for the set of individuals in the graphical user interface, as responsive to the set of individuals identified;

identifying a first scheduling option in the plurality of scheduling options for the set of individuals for scheduling one of the individuals in the set of individuals;

in response to identifying the first scheduling option selected for scheduling one of the individuals in the set of individuals, concurrently locking all of the plurality of scheduling options generated for the set of individuals, wherein another user associated with a second instance of the locator application is prevented from selecting the plurality of scheduling options that are locked until processing is complete by identifying one scheduling option in the plurality of scheduling options for each individual in the set of individuals and scheduling each individual in the set of individuals in the one of the plurality of scheduling options in the first instance of the locator application;

for each remaining individual in the set of individuals, identifying one scheduling option in the plurality of scheduling options in the first instance of the locator application; and launching a plurality of concurrent processes in the first instance of the locator application, wherein the plurality of concurrent processes schedule each individual in the set of individuals in the one corresponding scheduling option identified, and wherein the plurality of scheduling options remain locked until processing of the plurality of concurrent processes is completed.

10. The method of claim 9, wherein the at least one input parameter is at least a portion of an individual's name.

11. The method of claim 9, wherein the plurality of scheduling options includes either overlapping time slots or consecutive time slots based on one or more resources associated with each individual of the set of individuals, wherein when each individual of the set of individuals is associated with a same resource the plurality of scheduling options includes the consecutive time slots and when each individual of the set of individuals is associated with different resources the plurality of scheduling options includes the overlapping time slots.

12. The method of claim 9, wherein the scheduling options that are locked are inaccessible to a plurality of other concurrent instances of the locator application for a predetermined period of time.

13. The method of claim 9, wherein the plurality of scheduling options includes a combination of overlapping time slots and consecutive time slots.

14. One or more non-transitory computer storage media storing computer-useable instructions that, when used by one or more computing devices, cause the one or more computing devices to perform operations for addressing a technical challenge of interfacing scheduling applications with processing applications to populate processes for individuals concurrently, the media comprising:
- causing display in a graphical user interface a plurality of individuals identified as corresponding to a parameter;
- receiving, via the graphical user interface provided by a first instance of a first application, an indication of a plurality of patients to be coordinated;
- generating a plurality of scheduling options to accommodate the plurality of patients to be coordinated;
- causing display of the plurality of scheduling options for the set of individuals in the graphical user interface, as responsive to the set of individuals identified;
- identifying an indication of a first scheduling option selected from the plurality of scheduling options for the plurality of patients for scheduling one of the patients to be coordinated, wherein the first scheduling option includes a first set of time slots;
- in response to identifying the first scheduling option selected for scheduling one of the individuals in the set of individuals, concurrently locking all of the plurality of scheduling options generated for the plurality of patients including the first set of time slots, wherein another user associated with a second instance of the locator application is prevented from selecting any of the plurality of scheduling options that are locked until processes are completed by identifying indications of one or more of the plurality of scheduling options for remaining patients in the plurality of patients to be coordinated and scheduling the remaining patients in remaining scheduling options in the plurality of scheduling options in the first instance of the locator application;
- for each remaining individual in the set of individuals, identifying one scheduling option in the plurality of scheduling options in the first instance of the locator application; and
- launching a plurality of concurrent processes in the first instance of the locator application, wherein the plurality of concurrent processes schedule each individual in the set of individuals in the one corresponding scheduling option identified, and wherein the plurality of scheduling options remain locked until processing of the plurality of concurrent processes is completed.

15. The one or more non-transitory computer storage media of claim 14, wherein the plurality of time slots is generated based on one or more resources associated with each patient of the plurality of patients to be coordinated.

16. The one or more non-transitory computer storage media of claim 15, wherein the one or more resources comprises a professional, a location, or a device.

17. The one or more non-transitory computer storage media of claim 14, wherein the scheduling options that are locked are inaccessible to a plurality of other concurrent instances of the locator application for a predetermined period of time.

18. The one or more non-transitory computer storage media of claim 14, wherein the operations further comprise:
- generating a list of a plurality of patients satisfying at least one input parameter.

19. The one or more non-transitory computer storage media of claim 18, wherein the at least one input parameter is at least a portion of an individual patient's name.

20. The one or more non-transitory computer storage media of claim 14, wherein a second application to complete the first process for at least the first patient is launched from within the first application for coordinating the plurality of patients.

* * * * *